(12) United States Patent
Yasuda

(10) Patent No.: US 6,951,261 B2
(45) Date of Patent: Oct. 4, 2005

(54) POWER STEERING SYSTEM HAVING TORQUE SENSOR

(75) Inventor: Akio Yasuda, Kosai (JP)

(73) Assignee: Denso Corporation, Kariya (JP)

( * ) Notice: Subject to any disclaimer, the term of this patent is extended or adjusted under 35 U.S.C. 154(b) by 120 days.

(21) Appl. No.: 10/259,656

(22) Filed: Sep. 30, 2002

(65) Prior Publication Data

US 2003/0062215 A1 Apr. 3, 2003

(30) Foreign Application Priority Data

Oct. 1, 2001 (JP) .................................. 2001-305075

(51) Int. Cl.$^7$ ................................................ B62D 5/04
(52) U.S. Cl. ................. 180/444; 73/862.333; 180/444; 702/43; 702/151
(58) Field of Search ................................ 180/443, 444, 180/446, 421, 422; 73/862.333; 702/43, 151; 324/207.2

(56) References Cited

U.S. PATENT DOCUMENTS

| | | | |
|---|---|---|---|
| 4,874,053 A | | 10/1989 | Kimura et al. |
| 4,939,435 A | * | 7/1990 | Takahashi et al. ......... 318/432 |
| 5,490,431 A | * | 2/1996 | O'Mahony et al. .... 73/862.331 |
| 5,504,679 A | | 4/1996 | Wada et al. |
| 5,705,756 A | * | 1/1998 | LeMarquand et al. . 73/862.332 |
| 6,338,015 B1 | | 1/2002 | Kawagoe et al. |
| 6,400,142 B1 | * | 6/2002 | Schroeder ............... 324/207.21 |
| 6,467,360 B1 | | 10/2002 | Bogdanov |
| 6,489,761 B1 | * | 12/2002 | Schroeder et al. ...... 324/207.25 |
| 6,653,829 B1 | * | 11/2003 | Henry et al. ............ 324/207.21 |
| 6,701,792 B2 | * | 3/2004 | Laidlaw ................. 73/862.329 |
| 2002/0124663 A1 | * | 9/2002 | Tokumoto et al. ...... 73/862.333 |
| 2003/0034775 A1 | * | 2/2003 | Schroeder et al. ...... 324/207.21 |

FOREIGN PATENT DOCUMENTS

| | | |
|---|---|---|
| JP | A-8-108856 | 4/1996 |
| JP | A-2001-88728 | 4/2001 |
| JP | A-2001-159562 | 6/2001 |

* cited by examiner

Primary Examiner—Anne Marie Boehler
(74) Attorney, Agent, or Firm—Posz Law Group, PLC

(57) ABSTRACT

A power steering system includes a torsion bar, which is twistable around its axis for an amount corresponding to a steering torque applied to a steering shaft, a torque sensor, an electric motor, which is driven through a drive circuit to provide the steering shaft with steering assisting force, and motor control means for obtaining a steering torque from a digital signal transmitted from sensor and outputting a drive Duty signal to the drive circuit so that a current suitable for the steering torque is supplied to the electric motor. The torque sensor includes a permanent magnet, a magnetic body, and a Hall IC having a galvanomagnetic element, an AD converter circuit, and a serial communication circuit for digital communications with the motor control means through a communication line and a power supply ground line.

6 Claims, 5 Drawing Sheets

POWER STEERING SYSTEM HAVING TORQUE SENSOR

CROSS REFERENCE TO RELATED APPLICATION

This application is based on and incorporates herein by reference Japanese Patent Application No. 2001-305075 filed on Oct. 1, 2001.

BACKGROUND OF THE INVENTION

1. Field of the Invention

The present invention relates to a power steering system, which provides steering assisting force to a steering shaft.

2. Description of Related Art

Generally, in an electric power steering system, a torque sensor converts a torsional torque of a steering shaft, which is generated by steering of a steering wheel connected to the steering shaft, to an analog signal (voltage) and outputs it to an electronic control unit (ECU). In the ECU, an analogue to digital (AD) converter circuit converts the analogue signal to a corresponding digital value.

Therefore, when there is a difference between a reference voltage of the torque sensor and a reference voltage of the AD converter circuit, the measured torque value becomes erroneous and is not accurately transmitted. Thus, the voltage of the torque sensor and the voltage of the AD converter need to be matched with each other.

Japanese Unexamined Patent Publication No. 2001-88728 discloses such an electric power steering system. In the disclosed electric power steering system, a reference voltage of a torque sensor and a reference voltage of an AD converter circuit are supplied from a common power source to address the above disadvantage.

However, since the torque sensor and the ECU are distant from each other, for example, a voltage drop in electric lines, which connect between the torque sensor and the ECU, can occur, so that it is difficult to match the reference voltage of the torque sensor and the reference voltage of the AD converter with each other.

Furthermore, precise relative adjustment between the torque sensor and the ECU is required, and relatively high tolerance is required for the performance of the torque sensor. As a result, manufacturing and assembling costs are increased.

Furthermore, there are many difficulties in implementing of two or three torque sensors in the power steering system.

SUMMARY OF THE INVENTION

Thus, it is an objective of the present invention to provide a power steering system, which allows transmission of an amount of torsional twist of an elastic body (rod-shaped body) measured by a torque sensor to be transmitted to a drive device of the power steering system without substantially influenced by disturbances, such as a change in a power source voltage and a change in temperature.

To achieve the objective of the present invention, there is provided a power steering system for a vehicle. The power steering system includes a steering shaft, an elastic member, a torque sensor, an electric motor, a drive circuit and a motor control means for controlling the electric motor. The elastic member is connected to the steering shaft and is twistable around an axis of the elastic member by a steering torque applied to the steering shaft. The torque sensor includes a galvanomagnetic element, an AD converter circuit and a transfer means for transferring the digital signal. The galvanomagnetic element outputs an analogue electrical signal corresponding to an amount of torsional twist of the elastic member, which is twisted by the steering torque. The AD converter circuit converts the analogue electrical signal to a digital signal. The electric motor applies a steering assisting force to the steering shaft or a steering rack connected to the steering shaft. The drive circuit drives the electric motor. The motor control means controls the electric motor through the drive circuit. The motor control means obtains a value of the steering torque based on the digital signal transmitted from the transfer means and outputs a drive signal to the drive circuit in such a manner that electric current corresponding to the steering torque is supplied to the electric motor.

The transfer means can be replaced with a communication means for performing digital communications. Furthermore, the motor control means can include an electric power steering ECU, which includes a digital communication means for communicating with the communication means of the torque sensor and at least one other controller of the vehicle. The electric power steering ECU processes communications with the communication means of the torque sensor and communications with the at least one other controller of the vehicle in such a manner that the communications between the communication means of the torque sensor and the digital communication means of the electric power steering ECU has priority over communications between the at least one other controller of the vehicle and the digital communication means of the electric power steering ECU.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to FIGS. 1 to 6B.

Figure 3:
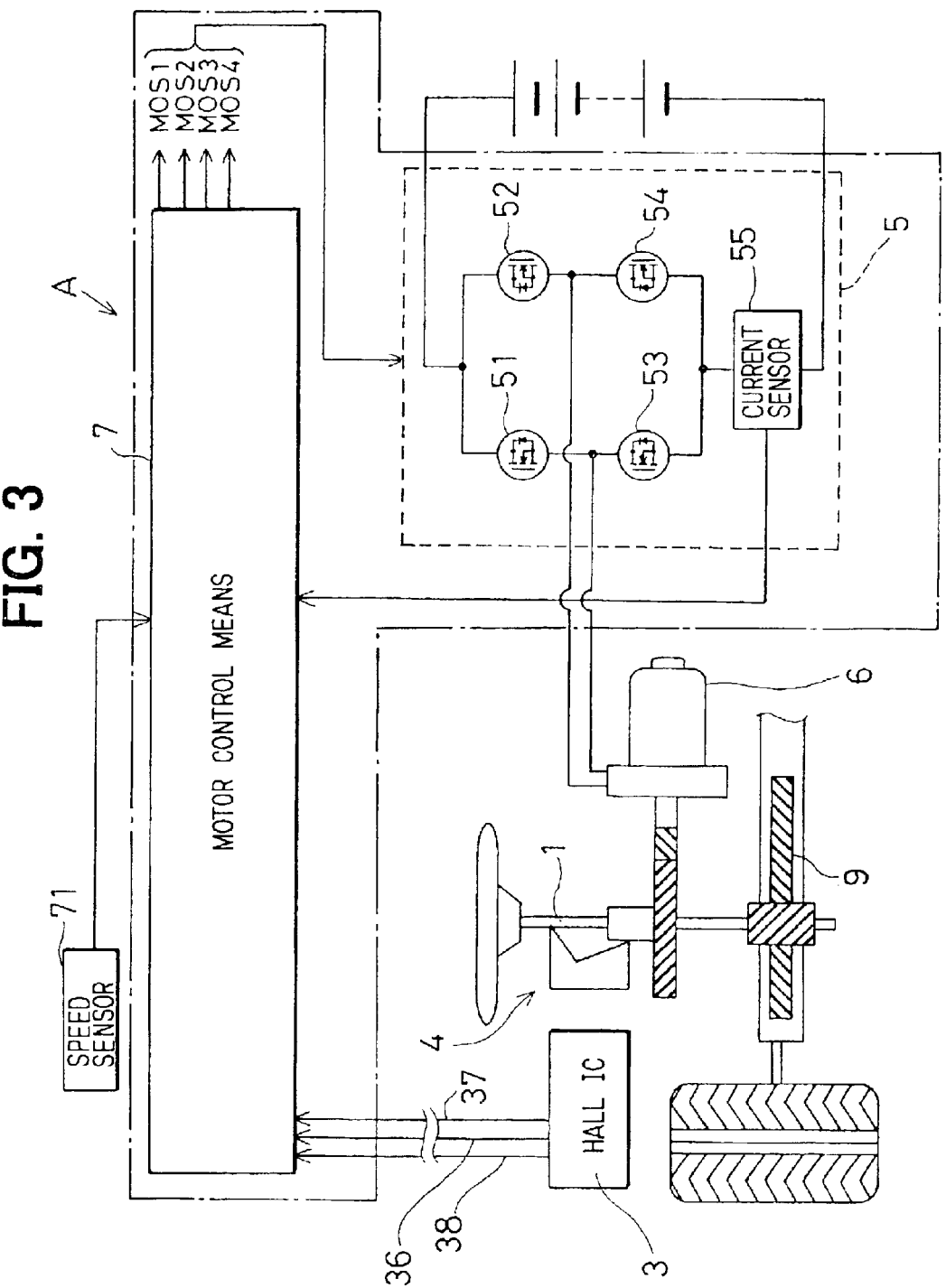
FIG. 3 is a block diagram of a power steering system according to the embodiment.
Figure 4:
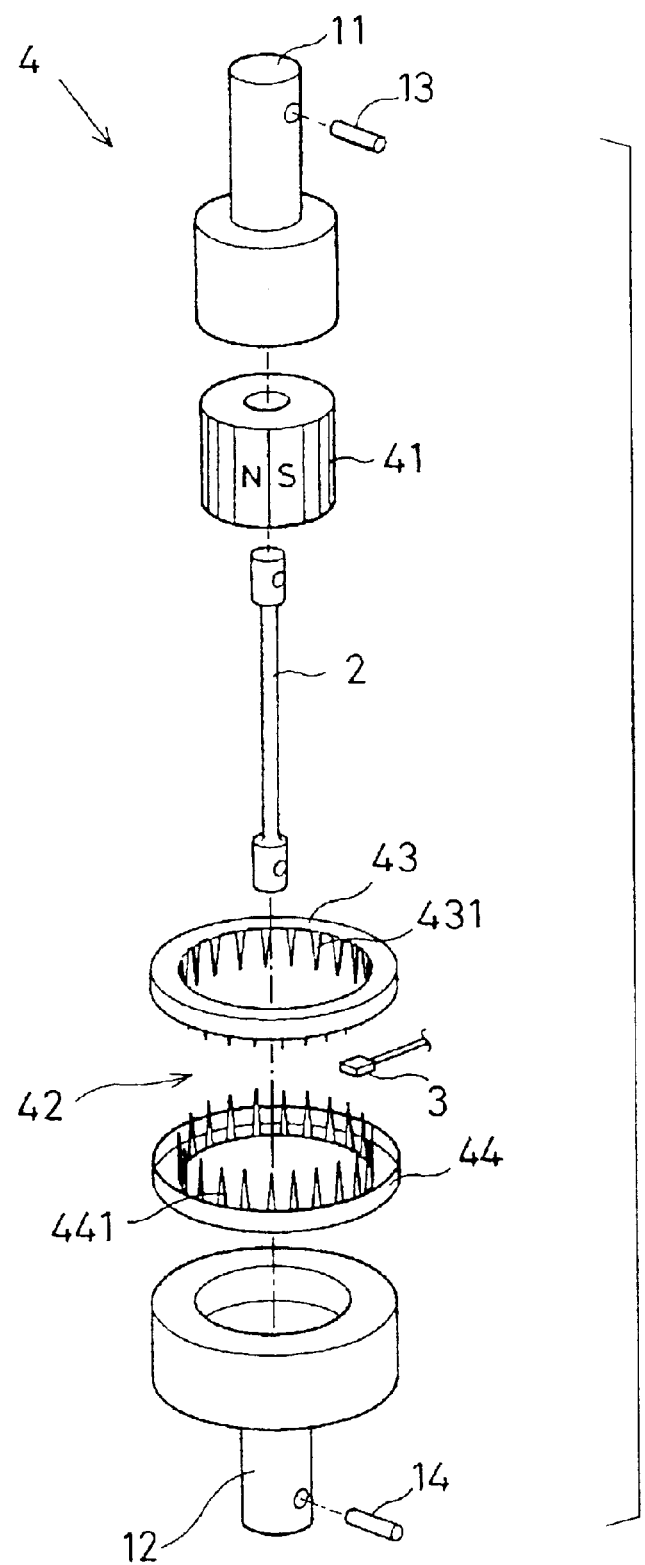
FIG. 4 is an exploded view of a torque sensor of the power steering system.

With reference to FIGS. 3 and 4, a power steering system A includes a torsion bar (elastic member in a form of a rod) 2, a torque sensor 4, an electric motor (drive device) 6 and a motor control means 7. The torsion bar 2 is twisted when a steering torque is applied to a steering shaft 1. The torque sensor 4 includes a Hall IC 3, a permanent magnet 41 and a magnetic body 42. The electric motor 6 is driven through a drive circuit 5. The motor control means 7 outputs a drive Duty signal to the drive circuit 5.

With reference to FIG. 4, one end (upper end in FIG. 4) of the torsion bar 2 is secured to an input shaft 11 of the steering shaft 1 through a pin 13, and the other end (lower end in FIG. 4) of the torsion bar 2 is secured to an output shaft 12 of the steering shaft 1 through a pin 14. The torsion bar 2 has predetermined torsion-torque characteristics.

The permanent magnet 41 of the torque sensor 4 has a ring shape or annular shape and is coaxially coupled with the input shaft 11. The permanent magnet 41 is magnetized in a circumferential direction. The permanent magnet 41 includes S poles and N poles, which are alternately arranged in the circumferential direction of the permanent magnet 41. A total number of the S poles and the N poles of the permanent magnet 41 is, for example, twenty four.

The magnetic body 42 of the torque sensor 4 is coaxially coupled with the output shaft 12 and is disposed in a magnetic field, which is generated by the permanent magnet 41, to form a magnetic circuit. A magnetic flux density of the magnetic circuit changes when relative position between the magnetic body 42 and the permanent magnet 41 is changed by the steering torque applied to the input shaft 11.

The magnetic body 42 includes a couple of annular magnetic yokes 43, 44 arranged adjacent to an outer peripheral surface of the permanent magnet 41. Each of the magnetic yokes 43, 44 has claws 431, 441, which are circumferentially arranged at equal intervals. A number of the claws 431, 441 of each of the magnetic yokes 43, 44 is the same as the number of the S poles or N poles and is, for example, twelve in this embodiment.

Figure 5:
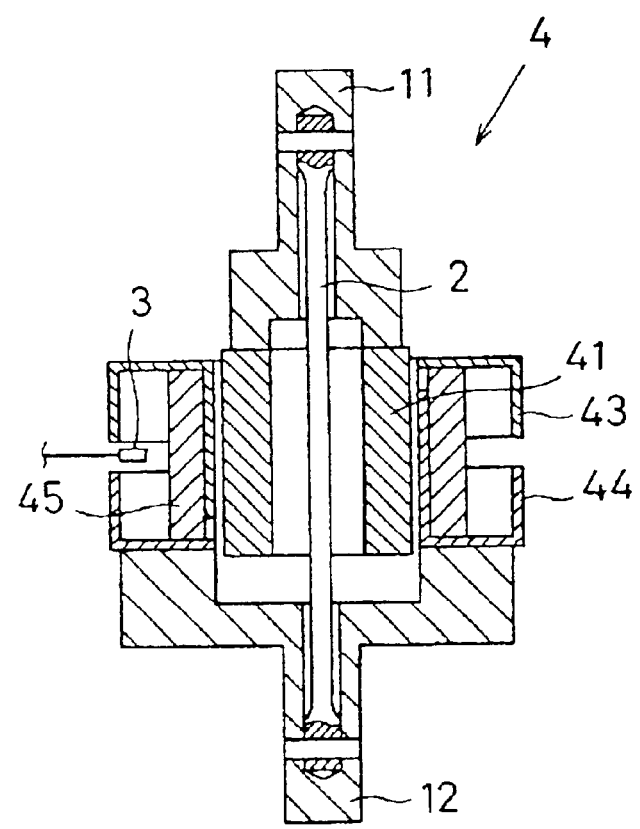
FIG. 5 is a longitudinal cross-sectional view of the torque sensor.

As shown in FIG. 5, the magnetic yokes 43, 44 are positioned by a securing element 45 such that the claws 431 are circumferentially shifted from the claws 441.

Figure 6A:
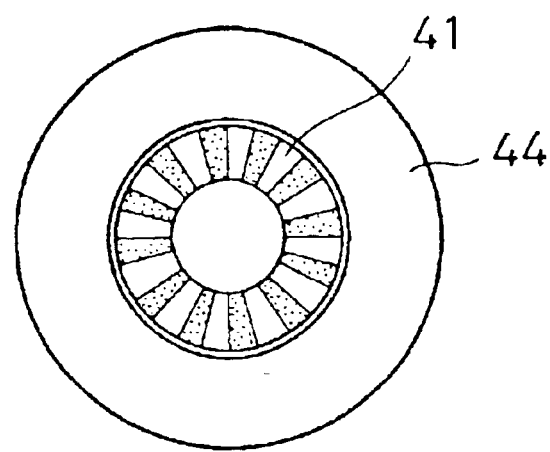
FIG. 6A is a plan view of the torque sensor.
Figure 6B:
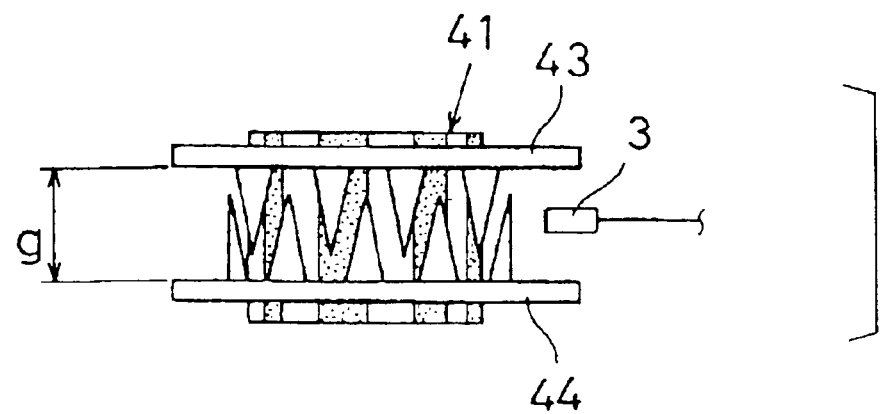
FIG. 6B is a side view of the torque sensor.

As shown in FIGS. 6A and 6B, the magnetic yokes 43, 44 are arranged such that the center of each claw 431, 441 is located generally at a boundary between the corresponding adjacent N pole and S pole of the permanent magnet 41 when the torsion bar 2 is not twisted.

Figure 1:
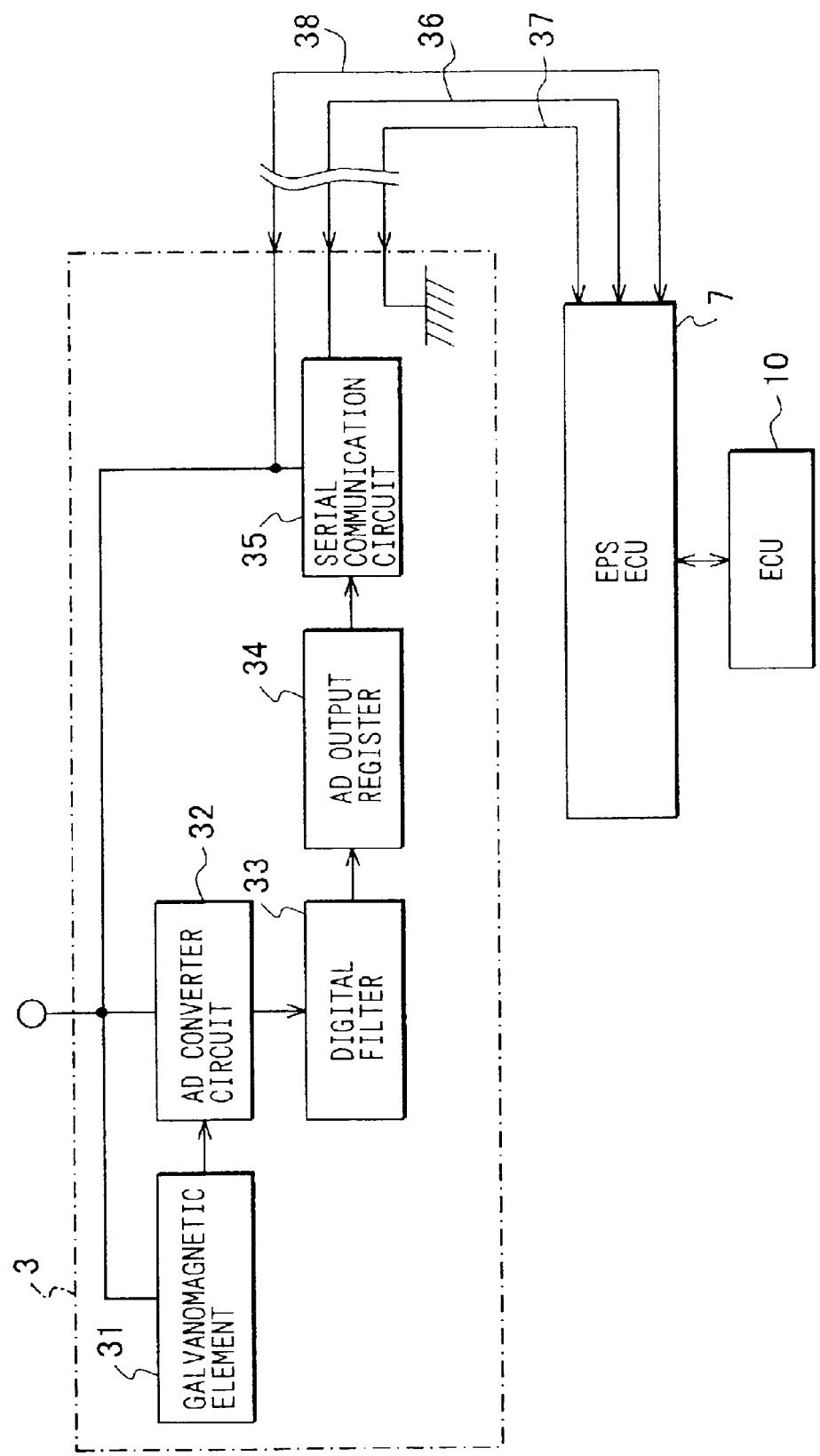
FIG. 1 is a block diagram showing an arrangement of a Hall IC, which performs serial digital communications with a motor control means, according to an embodiment of the present invention.
Figure 2:
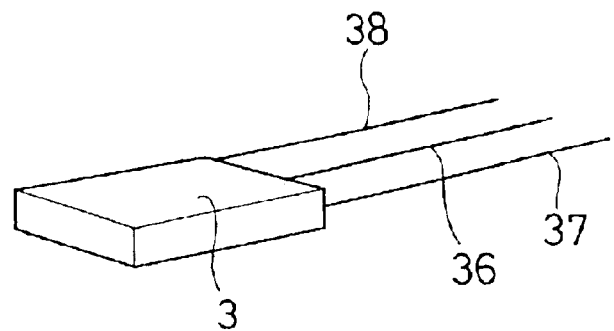
FIG. 2 is a schematic perspective view of the Hall IC.

As shown in FIGS. 1 and 2, the Hall IC 3 includes a galvanomagnetic element (e.g., Hall element) 31, an AD converter circuit 32, a digital filter 33, an AD output register 34 and a serial communication circuit (transfer means or communication means) 35, and these components are integrated into a single chip by molding.

The galvanomagnetic element 31 outputs an analog electrical signal corresponding to a change in the magnetic flux density in the magnetic circuit of the magnetic body 42.

The AD converter circuit 32 is a circuit that converts an analogue signal to a digital signal. Thus, the AD converter circuit 32 converts the analogue electrical signal, which is outputted from the galvanomagnetic element 31, to a corresponding digital signal.

The digital filter 33 is used to remove noises from the digital signal.

The Hall IC 3 is disposed in a gap g between the magnetic yoke 43 and the magnetic yoke 44, which are opposed to one another in the axial direction in FIG. 6B. The galvanomagnetic element 31 of the Hall IC 3 measures a change in the magnetic flux density in the magnetic circuit of the magnetic body 42.

The serial communication circuit 35 performs digital communications with the motor control means 7 at a transmission rate or communication rate of 50 kbps (this transmission rate can be 9600 bps or higher) through a single communication line (i.e., one communication line) 36 and a power supply ground line 37. Numeral 38 in FIGS. 1–3 indicates a power supply line.

A rotatable shaft or drive shaft of the electric motor 6 is connected to the steering shaft 1 through a speed reducing mechanism (not shown) to supply a steering assisting force to the steering shaft 1.

The drive circuit 5 includes four power MOSFETs 51–54 and CR parts (not shown) and drives the electric motor 6.

The motor control means 7 is an EPS ECU (serving as an electric power steering ECU). The motor control means 7 computes a steering torque based the digital signal transmitted from the serial communication circuit 35. The motor control means 7 outputs a drive Duty signal to the drive circuit 5 based on the steering torque, a motor electric current and vehicle speed information. The motor electric current is measured with a current sensor 55, and the vehicle speed information is transmitted from a vehicle speed sensor 71. Thus, assisting electric current, which corresponds to the steering torque and is suitable for the steering torque, is supplied to the electric motor 6.

The power MOSFETs 51–54 are driven to provide the electric current in a corresponding direction that is determined based on a sign (+ or –) of a drive torque or a specified value of the motor electric current. For example, in a case of rightward steering, the power MOSFETs 51, 54 are driven under a Duty control, and in a case of leftward steering, the power MOSFETs 52, 53 are driven under a Duty control. In this way, the assisting operation is performed in the direction corresponding to the steering direction.

The power steering system A according to the present embodiment provides the following advantages.

(A) The serial communication circuit 35 of the Hall IC 3 performs digital communications with the motor control means 7 at the transmission rate of 50 kbps through the single communication line 36 and the power supply ground line 37, and the serial communication circuit 35 transmits the digital signal (torque signal) to the motor control means 7.

That is, the torque signal in the form of digital signal is transmitted from the Hall IC 3 to the motor control means 7. Thus, the torque signal is not substantially influenced by disturbances, such as a change in the power source voltage and a change in the temperature.

As a result, even when the disturbances, such as a change in the power source voltage and a change in the temperature, exist, the torque signal is correctly transmitted from the Hall IC 3 to the motor control means 7, so that the power steering device A can apply the appropriate steering assisting force to the steering shaft 1.

Since the digital communications are of serial type, the digital communications can be performed with the smaller number of lines. Specifically, the digital communications can be carried out through the single communication line 36 and the power supply ground line 37. The communications between the torque sensor 4 and the motor control means 7 are performed through the dedicated communication lines. Furthermore, the communications between the torque sensor 4 and the motor control means 7 has priority over any other communications, such as communications between the motor control means (i.e., digital communication means of the motor control means) 7 and another controller or ECU 10 of the vehicle. Thus, there is no substantial queuing of transmitting digital signals, and the processing speed is not reduced.

In a case where digital signals (torque signals) are transmitted through a communication line of an in-vehicle LAN, which performs serial communications, when a relatively heavy communication load is applied to the communication line of the in-vehicle LAN, a processing speed of the ECU is reduced, and queuing of the transmitting digital signals occurs. Thus, the transmission of the digital signals (torque signals) through the communication line of the in-vehicle LAN is not suitable.

The digital communications are performed at the rate as high as 50 kbps, and therefore the electric motor 6 can provide the steering assisting force to the steering shaft 1 without substantial response delay, which could be annoying to the user.

(B) The torque sensor 4 includes the permanent magnet 41, the magnetic body 42 and the Hall IC 3. The permanent magnet 41 has the ring shape and is coaxially coupled with the input shaft 11. The permanent magnet 41 is magnetized in the circumferential direction. The magnetic body 42 is coaxially coupled with the output shaft 12 and is disposed in the magnetic field, which is generated by the permanent magnet 41, to form the magnetic circuit. The magnetic flux density of the magnetic circuit of the magnetic body 42 changes when relative position between the magnetic body 42 and the permanent magnet 41 is changed by the steering torque applied to the input shaft 11. The Hall IC 3 is disposed adjacent to the magnetic body 42 and has the galvanomagnetic element 31, which measures a change in the magnetic flux density in the magnetic circuit of the magnetic body 42.

When the steering torque is applied to the steering shaft 1, the torsion bar 2, which is connected between the input shaft 11 and the output shaft 12, is twisted to generate a torsional torque. Thus, the relative position between the permanent magnet 41 and the magnetic body 42 changes, causing a change in the density of the magnetic flux generated in the magnetic circuit.

The change in the magnetic flux density is detected by the galvanomagnetic element 31, and the torsional torque can be obtained based on the measurement of the galvanomagnetic element 31.

The Hall IC 3 includes the galvanomagnetic element 31, the AD converter circuit 32, the digital filter 33, the AD output register 34, and the serial communication circuit 35. These elements are integrated into the single chip by molding. Thus, the Hall IC 3 has a relatively small profile.

As described above, provision of any electrical contact is not required when the Hall IC 3 is arranged adjacent to the magnetic body 42. In other words, the Hall IC 3 can be provided in the gap g where a change in the magnetic flux density can be detected without making any contact with the steering shaft 1. This allows higher reliability of the power steering system.

Therefore, the low profile Hall IC 3 can be readily provided in the gap g where a change in the magnetic flux density can be detected.

The power steering system according to the above embodiment of the present invention can be modified as follows.

(a) The transfer means can conduct the digital signals only from the torque sensor side to the motor control means side (i.e., one way).

(b) The digital communications between the communication means of the torque sensor and the motor control means can be of a parallel type.

However, although the parallel communications are advantageous over the serial communications in terms of the communication rate, the parallel communication require the greater number of communication lines. For example, in order to transmit 10-bit data, ten communication lines are necessary. Thus, the input circuit of the CPU becomes more complicated.

(c) In general, when the CPU (motor control means) receives the digital signals transmitted from more than one torque sensors, the corresponding number of input ports need to be provided in the CPU.

However, when the single communication line and the power supply ground line are used, and transmissions of the digital signals from the torque sensors are time shifted, the number of the input ports of the CPU can be reduced, for example, to one. In such a case, the number of the AD converter circuits of the ECU can be reduced, so that a load on the ECU can be advantageously reduced.

Furthermore, in place of the Hall element, which serves as the galvanomagnetic element 31, any other galvanomagnetic element, which provides the galvanomagnetic element, can be used. Such a galvanomagnetic element could include an MR element or the like.

Also, in the above embodiment, the motor 6 is connected to the steering shaft 1 through the corresponding speed reducing mechanism to supply the steering assisting force to the steering shaft 1. This can be altered as follows. That is, the motor 6 can be alternatively connected to a steering rack 9 connected to the steering shaft 1, as shown in FIG. 3, to supply the steering assisting force to the steering rack 9.

Additional advantages and modifications will readily occur to those skilled in the art. The invention in its broader terms is therefore, not limited to the specific details, representative apparatus, and illustrative examples shown and described.

What is claimed is:

1. A power steering system for a vehicle, the power steering system comprising:

a steering shaft;

an elastic member, which is connected to the steering shaft and is twistable around an axis of the elastic member by a steering torque applied to the steering shaft;

a torque sensor, which includes:

a galvanomagnetic element, which outputs an analogue electrical signal corresponding to an amount of torsional twist of the elastic member, which is twisted by the steering torque;

an AD converter circuit, which converts the analogue electrical signal to a digital signal; and a communication means for performing digital communications;

an electric motor, which applies a steering assisting force to the steering shaft or a steering rack connected to the steering shaft;

a drive circuit, which drives the electric motor; and a motor control means for controlling the electric motor through the drive circuit, wherein:

the motor control means obtains a value of the steering torque based on the digital signal transmitted from the communication means and outputs a drive signal to the drive circuit in such a manner that electric current corresponding to the steering torque is supplied to the electric motor; and the motor control means includes an electric power steering ECU, which includes a digital communication means for communicating with the communication means of the torque sensor and at least one other controller of the vehicle, wherein the electric power steering ECU processes communications with the communication means of the torque sensor and communications with the at least one other controller of the vehicle in such a manner that the communications between the communication means of the torque sensor and the digital communication means of the electric power steering ECU has priority over communications between the at least one other controller of the vehicle and the digital communication means of the electric power steering ECU.

2. A power steering system according to claim 1, wherein the communication means of the torque sensor performs serial communications with the motor control means through one or two communication lines and a power supply ground line.

3. A power steering system according to claim 2, wherein the serial communications are performed at a communication rate equal to or higher than 9600 bps.

4. A power steering system for a vehicle, the power steering system comprising:

a steering shaft;

an elastic member connected to the steering shaft and twistable around an axis of the elastic member by a steering torque applied to the steering shaft;

a torque sensor including:
  a galvanomagnetic element outputting an analog electrical signal corresponding to an amount of torsional twist of the elastic member twisted by the steering torque;
  an AD converter circuit converting the analog electrical signal to a digital signal; and
  a first communication port for outputting the digital signal;

an electric motor applying a steering assisting force to one of: the steeting shaft, and a steering rack connected to the steering shaft; and a motor controller controlling the electric motor, wherein:

the motor controller obtains a value of the steering torque based on the digital signal output from the first communication port and outputs a drive signal to the motor controller such that an electric current corresponding to the steering torque is supplied to the electric motor, and the motor controller includes an electric power steering ECU having a second communication port for communicating with the first communication port and at least one other controller of the vehicle, wherein the electric power steering ECU processes communications with the first communication port and communications with the at least one other controller of the vehicle such that the communications between the first communication port and the second communication port have priority over communications between the at least one other controller of the vehicle and the second communication port.

5. A power steering system according to claim 4, wherein the first communication port performs serial communications with the motor controller through no more than two communication lines and a power supply ground line.

6. A power steering system according to claim 5, wherein the serial communications are performed at a communication rate equal to or higher than 9600 bps.

* * * * *